United States Patent
Reichert et al.

(10) Patent No.: US 11,537,576 B2
(45) Date of Patent: *Dec. 27, 2022

(54) ASSISTED PROBLEM IDENTIFICATION IN A COMPUTING SYSTEM

(71) Applicant: International Business Machines Corporation, Armonk, NY (US)

(72) Inventors: Michael Reichert, Hildrizhausen (DE); Matthias Tschaffler, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/127,625

(22) Filed: Dec. 18, 2020

(65) Prior Publication Data

US 2021/0103572 A1    Apr. 8, 2021

Related U.S. Application Data

(63) Continuation of application No. 15/836,647, filed on Dec. 8, 2017, now Pat. No. 10,929,364, which is a (Continued)

(51) Int. Cl.
*G06F 16/21* (2019.01)
*G06F 16/34* (2019.01)
*G06F 11/34* (2006.01)

(52) U.S. Cl.
CPC ........ *G06F 16/217* (2019.01); *G06F 11/3409* (2013.01); *G06F 2201/80* (2013.01); *G06F 2201/805* (2013.01); *G06F 2201/86* (2013.01)

(58) Field of Classification Search
CPC ............. G06F 11/3409; G06F 2201/80; G06F 16/217; G06F 2201/86; G06F 2201/805
(Continued)

(56) References Cited

U.S. PATENT DOCUMENTS 5,617,514 A *  4/1997  Dolby .................... G06F 30/18
                                                         706/45
6,118,982 A     9/2000  Ghisler et al.
(Continued)

OTHER PUBLICATIONS

List of IBM Patents or Patent Applications Treated as Related, Jan. 11, 2021, pp. 1-2.
(Continued)

*Primary Examiner* — Kuen S Lu
(74) *Attorney, Agent, or Firm* — Shackelford, Bowen, McKinley & Norton, LLP

(57) ABSTRACT

A method, system and computer program product for providing support for identification of the problem root cause in a computing system. Knowledge base mapping monitoring programs with respective to one or more technical problem definitions and a predefined system configuration are provided. The technical problems are defined using a predefined data structure. An inquiry relating to the computing system is received from a requester. The inquiry indicates a technical problem statement of the computing system. The received inquiry is parsed for constructing a problem description in accordance with the predefined data structure. A set of monitoring programs of the knowledge base may be identified using the problem description. Using software and/or hardware configuration data of the computing system, the set of monitoring programs may be instantiated in a monitor system. The instantiated programs may be provided to the requester as support for identification of the problem root cause.

10 Claims, 6 Drawing Sheets

Related U.S. Application Data continuation of application No. 15/349,591, filed on Nov. 11, 2016, now Pat. No. 10,929,363.

(58) Field of Classification Search
USPC .......................................................... 707/688
See application file for complete search history.

(56) References Cited

U.S. PATENT DOCUMENTS

| | | | |
|---|---|---|---|
| 7,099,879 | B2 | 8/2006 | Tacaille et al. |
| 7,246,159 | B2 | 7/2007 | Aggarwal et al. |
| 7,685,092 | B2 | 3/2010 | Reichert et al. |
| 7,685,118 | B2 * | 3/2010 | Zhang .................. G06F 16/367 706/45 |
| 7,694,192 | B2 | 4/2010 | Bantz et al. |
| 8,452,756 | B2 | 5/2013 | Anderson et al. |
| 2004/0225381 | A1 * | 11/2004 | Ritz .................... G06F 11/0793 700/87 |
| 2007/0299389 | A1 * | 12/2007 | Halbert ................ A61B 5/0205 604/131 |
| 2008/0091454 | A1 * | 4/2008 | Fisher ................... G06Q 10/10 705/301 |
| 2010/0312776 | A1 | 12/2010 | Burrichter et al. |
| 2011/0067007 | A1 * | 3/2011 | Zamarreno ......... G06F 11/3612 717/128 |
| 2011/0131316 | A1 * | 6/2011 | Ferris .................. G06F 11/3086 718/1 |
| 2017/0034023 | A1 * | 2/2017 | Nickolov ............ H04L 43/0817 |
| 2017/0201372 | A1 * | 7/2017 | Tomomura ............ G06F 3/0623 |
| 2018/0191753 | A1 * | 7/2018 | Lietz ...................... G06F 21/55 |

OTHER PUBLICATIONS

IBM "DB2 Tools Product Documentation," http://www-01.ibm.com/support/docview.wss?uid=swg27020910#omegaxepe-lib, 2016, pp. 1-48.

Pavani et al., "A Novel Approach for Elastic Query Processing in the Cloud," Global Journal of Computer Science and Technology, vol. 14, Issue 4, 2014, pp. 1-8.

Office Action for U.S. Appl. No. 17/127,447 dated Mar. 24, 2022, pp. 1-45.

Office Action for U.S. Appl. No. 17/127,447 dated Jul. 29, 2022, pp. 1-22.

Office Action for U.S. Appl. No. 17/127,447 dated Sep. 21, 2022, pp. 1-22.

* cited by examiner

| Monitor prog. | config1 | config2 | prob1 | prob2 | sys1 | sys2 |
|---|---|---|---|---|---|---|
| prog 1 | x | x | x | x | x | x |
| prog 3 | x | x | x | x | x | x |
|  |  | x | x | x | x | x |
|  | x | x | x | x | x | x |
|  | x | x | x | x | x | x |
| prog N | x | x | x | x | x | x |

Fig. 3

ASSISTED PROBLEM IDENTIFICATION IN A COMPUTING SYSTEM

TECHNICAL FIELD

The present invention relates generally to database management systems, and more particularly to providing support for identification of problem root cause in a computing system.

BACKGROUND

Many users are faced with everyday computer problems, but are unable to diagnose the actual problem in an efficient manner. While there are many problems a computer will be faced with, there is an increasing need to improve problem identification and solution.

SUMMARY

In one embodiment of the present invention, a computer-implemented method for providing support for identification of problem root cause in a computing system comprises providing a knowledge base for mapping monitoring programs with respective to one or more technical problem definitions and a predefined system configuration, the technical problems being defined using a predefined data structure. The method further comprises providing a monitor system for monitoring the computing system using the monitoring programs. The method additionally comprises receiving from a requester an inquiry relating to the computing system, the inquiry indicating a technical problem statement of the computing system. Furthermore, the method comprises parsing the received inquiry for constructing a problem description in accordance with the predefined data structure that is used to define the technical problems that are stored in the knowledge base. Additionally, the method comprises identifying a set of monitoring programs of the knowledge base using the constructed problem description. In addition, the method comprises using software and/or hardware configuration data of the computing system for instantiating the set of monitoring programs in the monitor system. The method further comprises providing the instantiated programs to the requester as support for identification of the problem root cause.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 shows an example content of a knowledge base as being built by the present method in accordance with an embodiment of the present invention;

DETAILED DESCRIPTION

Figure 1:
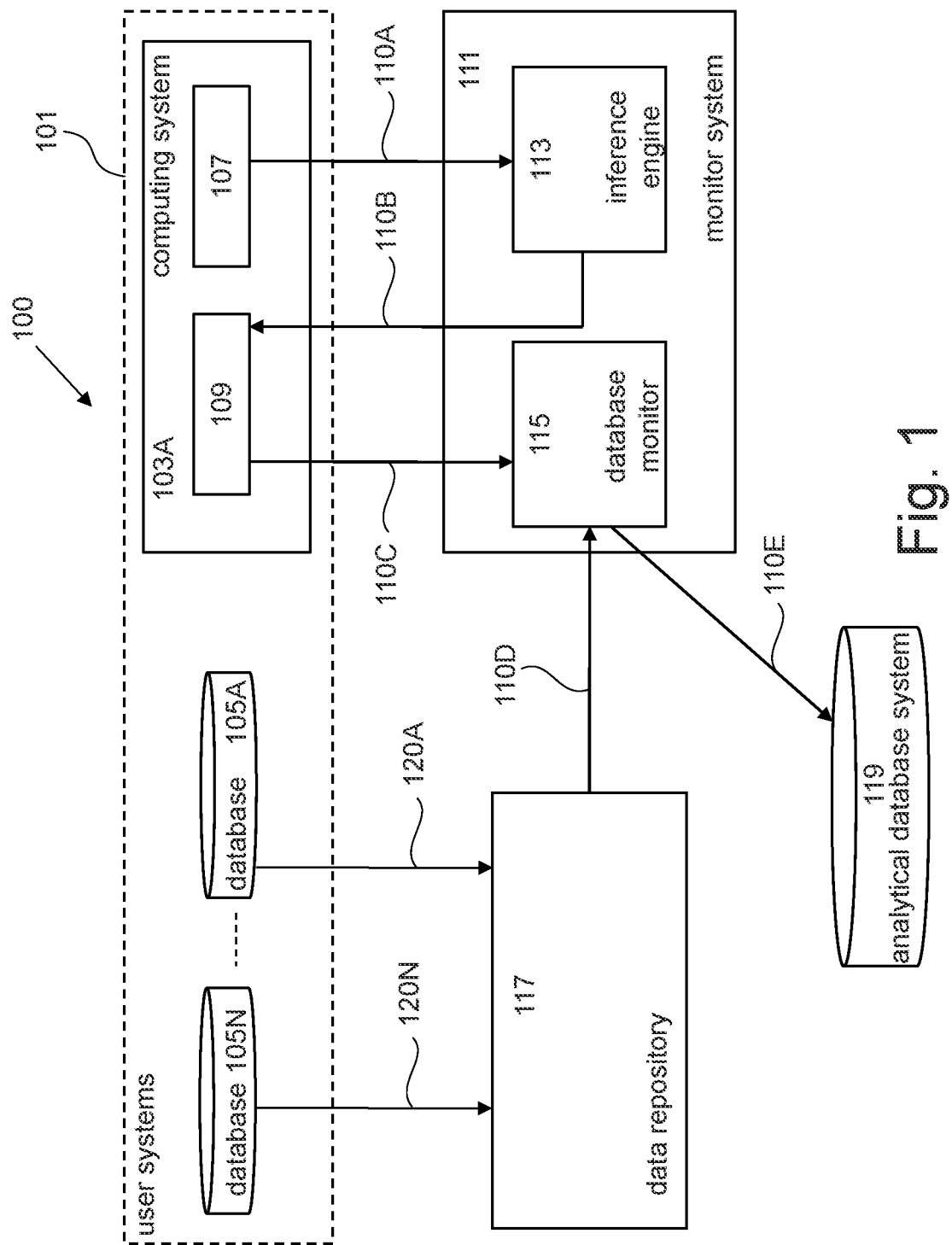
FIG. 1 depicts at block diagram representation of a data processing system in accordance with an embodiment of the present invention.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "monitoring program" as used herein refers to the software used to implement a monitoring function or monitoring workflow. The monitoring program may use information indicating a log file path and/or number of threads to run with, etc. The execution of the monitoring program may comprise observing and collecting state data, communication or performance data of the monitored system, changing parameters in the monitored system, running one or more scripts on the monitored system.

The technical problem indicated in the inquiry may be a system performance problem or application performance problem, such as a database performance problem of a database that is controlled or accessed by the computing system.

The computing system may be an enterprise system that comprises or runs an enterprise application. An enterprise application refers to a collection of collaborating software components that provide a common service to users, e.g., a travel application including web servers, Java Enterprise Edition servers, messaging queuing software, and databases.

For example, the inquiry (e.g., provided via a search engine like interface or a BOT interface) may be natural language questions, keyword search patterns, plaintext, statement, etc.

In another example, the inquiry may automatically be generated or triggered by a system exception or failure. For example, an operating system may be the requester of the inquiry.

Even experienced database administrators (DBAs) might not be acquainted with all features and functions of a monitoring product. Thus, DBAs might stick to well-known but ineffective monitoring procedures or even are not able to solve the root cause of a certain performance problem but rather mitigate it. Things get even worse if unexperienced DBAs try to solve a database performance problem without having a sound understanding of the monitoring product.

The present method may have the advantage of providing a reliable technique for solving technical problems by reducing the number of user interventions to a minimum. Thus, even very unexperienced users may solve very complex technical issues without even having technical domain knowledge at all using the present method.

According to one embodiment, a monitoring program of the monitoring program comprises real-time data monitoring instructions that when executed perform a real-time evaluation of current performances of the computing system. This may have the advantage of an accurate identification of the technical problem and thus may enable solving the issues in an efficient manner compared to an offline analysis. In a real-time mode, the system and method display the state of the execution of the monitoring program by indicating active threads and/or active nodes of a graph.

According to one embodiment, a monitoring program of the monitoring programs comprises instructions that when executed perform an offline evaluation of the performances of the computing system using historical data collected for at least the computing system. For example, historical data may comprise data collected for other systems having similar configurations as the computing system. This embodiment may enable predicting the problem or the root cause of the problem in an efficient manner. By contrast to the real time analysis this method may have the advantage of enabling a remote execution of the monitoring programs and thus may save resources of the computing system in particular as the history analysis may require a shared amount of resources.

According to one embodiment, the set of monitoring programs comprise multi-step processing instructions that when executed perform a guided step-by-step execution or process e.g., an interactive workflow. For example, the guided step-by-step execution may comprise presenting a wizard to a user to perform the step-by-step process. Each step may be indicated as being one of confirmation, processing, optional input, or mandatory input. The wizard may present a user interface associated with each step in the step-by-step process. This may have the advantage of providing a gradual method for efficiently detecting the source of the problem.

According to one embodiment, the switch between the steps is controlled by the requester. This step-by-step mode of operation allows a user to control the execution during program steps of particular interest to the user. For example, a sequence of events that is of particular concern may be slowed to the step-by-step execution of events, while fully tested portions of the program may be run at 100% in a continuous mode.

According to one embodiment, the monitor system is part of the computing system, or of a remote computing system connected to the computing system. This may have the advantage of providing a central monitor system that can be used by multiple computing systems connected to the monitor system. The monitor system may be configured to run with a search engine like interface for providing supports for solving technical problems in computing systems.

According to one embodiment, the method further comprises receiving a selection of one or more instantiated programs, and responsive to the received selection executing the selected monitoring programs on the computing system via the associated monitoring system.

According to one embodiment, the method further comprises: providing an interface, wherein the inquiry is received via the interface, the providing of the instantiated programs comprising: displaying on the interface user interface elements pointing to the instantiated programs in the monitoring system.

According to one embodiment, the user interface elements comprise hyperlinks. These embodiments may have the advantage of efficiently controlling the execution of the instantiated programs while maintaining the number of user interventions at minimum.

According to one embodiment, the method further comprises: assigning to each of the instantiated programs a residency time; in response to determining that the time elapsed from providing an instantiated program of the instantiated programs exceeds the respective residency time deleting the instantiated program. The deleting of the instantiated program may comprise deleting the associated API-call e.g. the associated URL is outdated once the residency time is elapsed. For example, if the residency time is to elapse in one predefined time period (e.g., after the next 5 min, the residency time may elapse) a warning or notification message may be sent or displayed to the user during the time period. The message indicates that the instantiated program will be deleted. This embodiment may be advantageous as it may avoid executing outdated monitoring functions that may depend on time, in particular, the system configuration and data configuration may evolve with time. This may also save computing resources (CPU, Memory, Disk Storage) on the system implementing this embodiment.

According to one embodiment, the method further comprises: building a data repository by collecting event data indicating the computing system and/or other computing systems, the event data indicating at least the workload and resource utilization of the computing system and/or the other computing systems; executing a selected instantiated program of the instantiated programs comprising processing the event data using one or more analysis functions. The event data may be traced, created or generated by the respective computing system and/or other computing systems. Using multiple systems to collect event data may increase the analysis sample size and thus may provide an accurate result compared to the case where data are from a single system. This may further increase the accuracy of the detecting the source of the problem.

According to one embodiment, the processing of the event data is offloaded on an Online Analytical Processing (OLAP) system for performing the one or more analysis functions. This may have the advantage of making use of existing systems and thus may save processing time that would otherwise be required for extra resources for performing the analysis. This embodiment may reduce the time required for providing feedbacks to a user as the OLAP system may be optimally adapted for performing the analysis functions.

According to one embodiment, the event data comprises system management facilities, System Management Facility (SMF), records. This embodiment may have the advantage of seamlessly being integrated in existing systems e.g., existing enterprise system.

According to one embodiment, the data structure comprises one or more fields each representing an attribute, wherein the attribute is a parameter indicative of the technical problem, the parameter comprising at least one of: problem category; time Frame of problem occurrence; name of the computing system; and name of logical partition (LPAR) on which the computing system is running. The definition of the data structure may enable a systematic method for identifying the problems in the knowledge base and may thus reduce the user interventions.

According to one embodiment, the problem category is evaluated for the received problem statement by performing a semantic distance search of the problem statement in metadata comprising a mapping between problem categories and problem definitions.

According to one embodiment, the identifying of the set of monitoring programs is performed using a semantic distance search in the knowledge base for the constructed problem.

FIG. 1 depicts at block diagram representation of a data processing system 100 for providing support for identification of problem root causes.

The data processing system 100 comprising a client or user side system 101. The user side system 101 may comprise one or more computing systems 103A-103N. For simplification purpose only one computing system 103A is shown. The user system 101 may further comprises user databases 105A-105N, wherein each or part of the databases 105A-105N may be associated or connected to the computing system 103A. For example, computing system 103A may have access to database 105A, while another computing system 103N may have access to database 105N. In one example, each of the computing system 103A-103N may comprise a database management system such as IBM DB2 for z/OS for controlling access to data in databases 105A-105N.

In one example, the computing systems 103A-103N may be separate computing systems.

In another example, at least part of the computing systems e.g., 103A-103B may be part of a single computer system (e.g., a z196 computer), wherein applications of each computing system 103A-103B may run within a respective LPAR of the single computer system. The remaining computing systems 103C-103N may be separate systems or may be at least partially contained in a respective single computer as it is the case of computing systems 103A-103B. An example of such computing systems 103A-103N may be IBM DB2 for z/OS subsystems.

The computing system 103A (and each of computing systems 103B-103N) comprises a search application 107 and a user monitoring engine 109. Search application 107 may for example provide a "search engine like interface" to enable a user (e.g., a database administrator (DBA)) to report a technical problem in the computing system 103A and/or databases 105A-N. For example, the interface may be a web user interface (UI). The user may enter an inquiry describing a monitoring problem in the web UI, and the inquiry may be sent (110A) to a monitor system 111.

The monitor system 111 may receive the inquiry at an inference engine 113. The inference engine 113 may for example perform the functionality of an IBM Watson as a cognitive computing system in order to process the received inquiry. In another example, the inference engine 113 may control an IBM Watson computing system in order to process the received inquiry.

The inference engine 113 may process the received inquiry and may return (110B) the results to the user monitoring engine 109. The results (110B) may indicate one or more monitoring programs. The user monitoring engine 109 may be configured to provide service requests to the monitor system 111 to indicate that one or more monitoring programs may be executed or processed. The service request may include a SOAP API call or a REST API call. For example, the monitoring via REST-API can be implemented as a Java based application using JAX-RS as the Java-API for restful web services.

For example, upon receiving the results (110B) the user monitoring engine 109 may send a service request (110C). The service request may for example comprise or indicate a monitoring program that was indicated in the received results (110B). The service request may be received (110C) at database monitor 115 of the monitor system 111.

In one example, the monitoring program that is indicated in the results (110B) may be one of the monitoring functions of IBM® Tivoli® OMEGAMON® XE for DB2® Performance Expert (OMPE) on z/OS® system. The OMPE system may be a tool to monitor, analyze and tune the performance of IBM DB2 for z/OS and IBM DB2 applications. The database monitor 115 may implement part or all of the functionality of the OMPE system. In another example, the database monitor 115 may control the OMPE system to perform or process the received monitoring program. The user monitoring engine 109 as a REST-API may be adapted for interacting with the OMPE system functionality. An example method for implementation feasibility rational for the REST-API may be as follows: OMPE system may be shipped with a fat Java client called Performance Expert client (PE client). This client offers a wide variety of monitoring functions like display of currently running database applications, display of DB2 for z/OS system parameters, different DB2 for z/OS statistics categories, etc. The performance metrics are displayed in a graphical window UI. So the PE client code can be used as a code core that is decorated with a REST-API. This code base is then providing the performance metrics encoded as JSON objects to any consumer. From an architectural point of view the monitoring REST-API represents a layer on top of the monitoring infrastructure.

The database monitor 115 may perform or execute the monitoring program using a process engine as described below. For example, if the monitoring program relies on the analysis of historical data, the execution of the monitoring program may involve the reading (110D) of data from the data repository 117. The read data may then be analyzed. In one example, the analysis of the read data may be offloaded (110E) to an analytical database system 119 such that the analytical database system 119 may perform the monitoring function making uses of its exiting tools and structures.

The data repository 117 may comprise event data indicating the computing systems 103A-103N. The event data may indicate at least the workload and resource utilization of the computing systems 103A-103N. The event data may comprise SMF records that are obtained e.g., from databases 105A-105N as indicated by reference numbers 120A-120N.

Using the above example, the data repository 117 may be a centralized storage of SMF data for all monitored systems 103A-103N such as DB2 for z/OS subsystems. The data repository 117 may for example be loaded into an OMPE performance database before being processed. SMF data may be available for several mainframe products including DB2, IMS, CICS and z/OS. SMF data from remote DB2 for z/OS subsystems can be stored centralized using shared disk devices or by using a kind of SMF data forwarding facility that pushes SMF records via network to the central repository. For example, the data repository 117 may maintain a schema for each monitored computing system 103A-103N (e.g., DB2 for z/OS subsystems) containing tables adequate to store information provided by different types of SMF records (accounting, statistics, application performance level information).

Performance database queries directed to the data repository 117 may be speed up by for example offloading the tables of the data repository 117 to an accelerator of the analytical database system 119. The offloading may be performed on demand, for example, to satisfy a higher priced SLA ("I am willing to pay more if I get faster response time"). For example, the analytical database system 119 may comprise an IBM DB2 Analytics Accelerator (IDAA).

One or more networks (not shown) may communicatively connect between the various elements of the data processing system 100. The network may be a public network, such as the Internet, a private network, such as a wide area network (WAN), a local area network (LAN) be it wired or wireless, and any combinations thereof.

Figure 2:
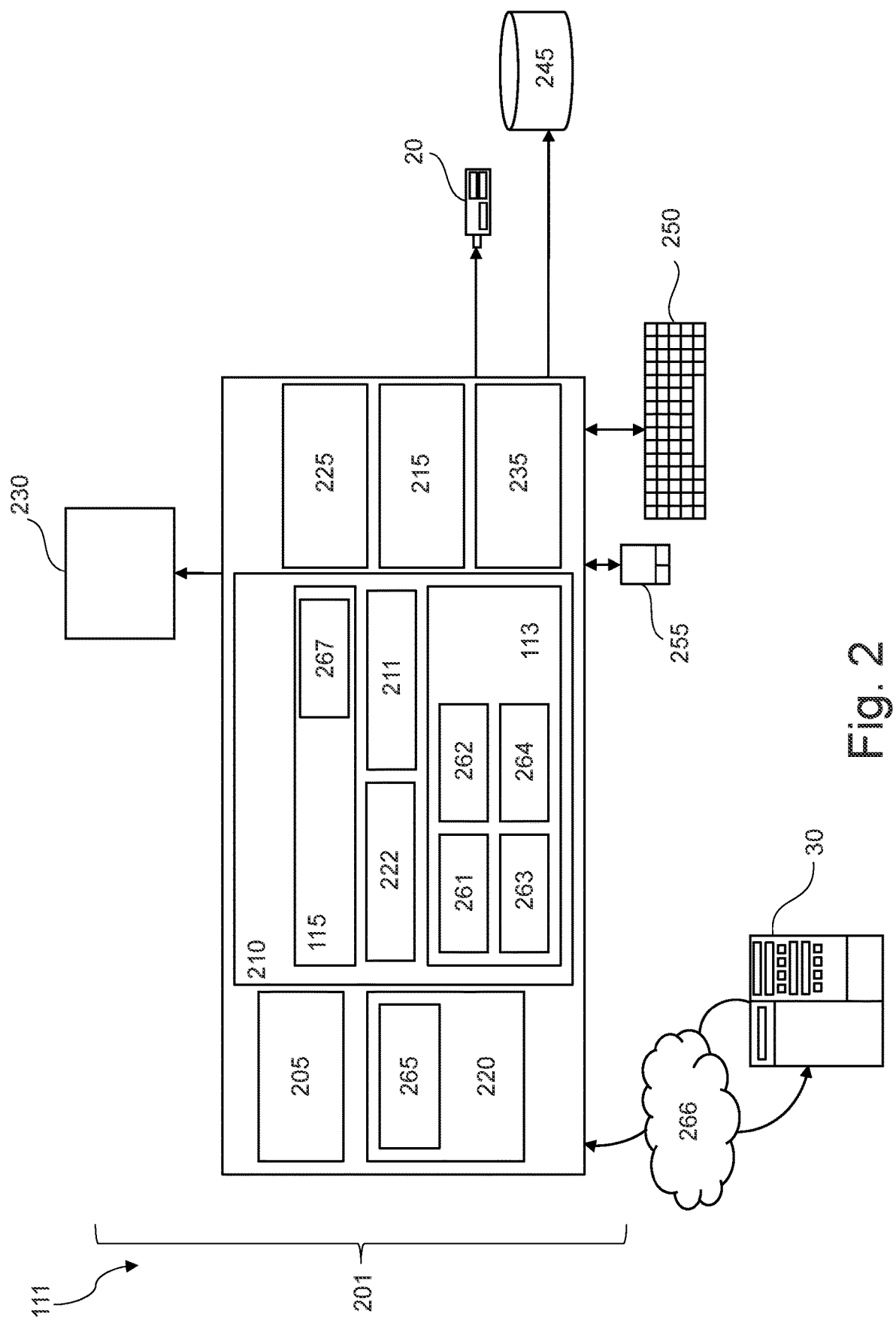
FIG. 2 represents a computerized system, suited for implementing one or more method steps as involved in the present disclosure in accordance with an embodiment of the present invention.

FIG. 2 depicts an example hardware implementation of monitor system 111. FIG. 2 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software (including firmware 222), hardware (processor) 205, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 201.

In exemplary embodiments, in terms of hardware architecture, as shown in FIG. 2, the computer 201 includes a processor 205, memory (main memory) 210 coupled to a memory controller 215, and one or more input and/or output (I/O) devices (or peripherals) 20, 245 that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 245 may generally include any generalized cryptographic card or smart card known in the art.

The processor 205 is a hardware device for executing software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 210 can have a distributed architecture, where various components are situated remote from one another, but can be accessed by the processor 205.

The software in memory 210 may include one or more separate programs, each of which comprises an ordered listing of executable instructions for implementing logical functions, notably functions involved in embodiments of this invention. In the example of FIG. 2, the memory 210 includes the inference engine 113 and the database monitor 115.

The software in memory 210 shall also typically include a suitable operating system (OS) 211. The OS 211 essentially controls the execution of other computer programs, such as possibly inference engine 113 and the database monitor 115.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 210, so as to operate properly in connection with the OS 211. Furthermore, the methods can be written as an object oriented programming language, which has classes of data and methods, or a procedure programming language, which has routines, subroutines, and/or functions.

The inference engine 113 comprises a parser 261. The parser 261 may for example be configured for parsing inquiries such as the received inquiry (110A) and constructing a problem description based on the problem statement in the received inquiry. The received inquiry may be in a plaintext format. The inference engine 113 may further comprise a result generator 262. The result generator 262 may take the problem description of the parser 261 as input and creates a ranked list of monitoring plans or programs (e.g., annotated with explanations) using a knowledge base 265 of the monitor system 111. The knowledge base 265 may be stored in association with the inference engine 113. The knowledge base 265 may for example comprise indications of monitoring programs such a names or references or location addresses of the monitoring programs, wherein each monitoring program is associated with one or more technical problem definitions and a predefined system configuration. The knowledge base 265 may be stored in the storage 220 or memory 210 or in a remote storage e.g. 245 to which the computer 201 is connected. The remote storage 245 may for example comprise a disk based storage.

The inference engine 113 may further comprise a result instantiator 263. The result instantiator 263 takes the ranked list of monitoring programs and instantiates for each monitoring program of the list the monitoring program configuration a process in the process engine 267 of the database monitor 115. Furthermore, for each instantiated monitoring program, a REST-API call may be created to start the associated process. The output of the result instantiator 263 maybe a ranked list of REST-API calls annotated with explanations. The ranked list of REST-API calls may be used as input to result representor 264 of the inference engine 113. The ranked list of REST-API calls may be transformed by the result representor 264 into a web page with hyperlinks each associated with a REST-API call of the REST-API calls and the web page may be returned to the user of the computing system 103A (e.g., as part of the results (110B)). The process engine 267 may be configured to execute the one the instantiated programs processes that is selected by the user on the web page, that selected link is for example indicated in the service request (110C).

In exemplary embodiments, a conventional keyboard 250 and mouse 255 can be coupled to the input/output controller 235. Other output devices such as the I/O devices 245 may include input devices, for example but not limited to a printer, a scanner, microphone, and the like. Finally, the I/O devices 20, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 20, 245 can be any generalized cryptographic card or smart card known in the art. The system 100 can further include a display controller 225 coupled to a display 230. In exemplary embodiments, the system 100 can further include a network interface for coupling to a network 266. The network 266 can be an IP-based network for communication between the computer 201 and any external server, client and the like via a broadband connection. The network 266 transmits and receives data between the computer 201 and external systems 30, which can be involved to perform part or all of the steps of the methods discussed herein. In exemplary embodiments, network 266 can be a managed IP network administered by a service provider. The network 266 may be implemented in a wireless fashion, e.g., using wireless protocols and technologies, such as WiFi, WiMax, etc. The network 266 can also be a packet-switched network such as a local area network, wide area network, metropolitan area network, Internet network, or other similar type of network environment. The network 266 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the software in the memory 210 may further include a basic input output system (BIOS) 222. The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to execute software stored within the memory 210, to communicate data to and from the memory 210, and to generally control operations of the computer 201 pursuant to the software. The methods described herein and the OS 211, in whole or in part, but typically the latter, are read by the processor 205, possibly buffered within the processor 205, and then executed.

When the systems and methods described herein are implemented in software, as is shown in FIG. 2, the methods can be stored on any computer readable medium, such as storage 220, for use by or in connection with any computer related system or method. The storage 220 may comprise a disk storage, such as HDD storage.

Figure 3:
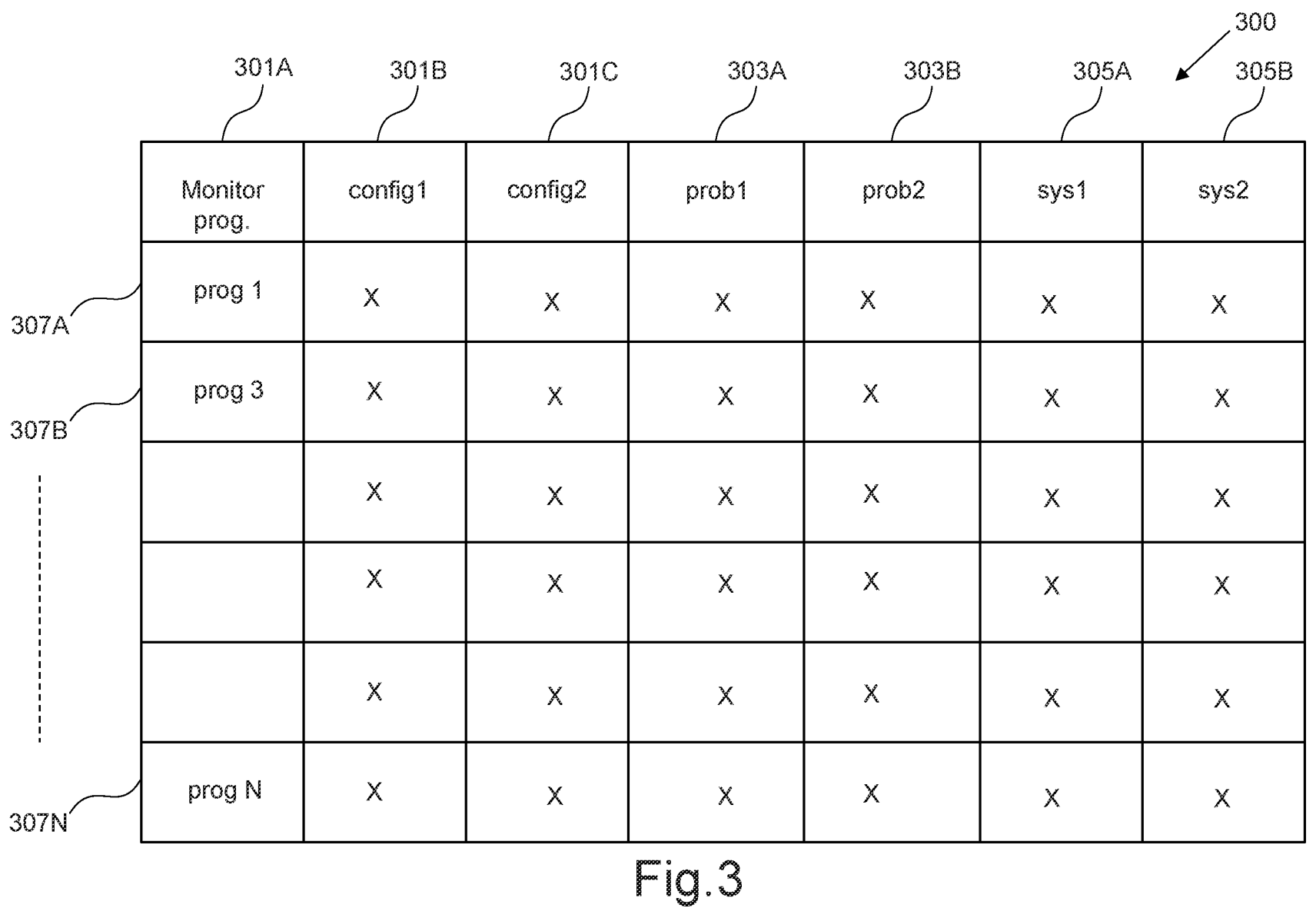

FIG. 3 shows an example content of the knowledge base 265 as being built by the present method.

The knowledge base 265 may for example comprise a table 300. Table 300 includes records 307A-307N. Table 300 includes fields for a monitoring program 301A-301C ("Monitor. prog.", "config1", "config2"), technical problem definitions 303A-303B ("prob1", "prob2"), and technical system definitions 305A-305B ("sys1", "sys2"). The format of the knowledge base is shown as an example; however, other formats for containing the information of the knowledge base may be used such as JSON like format, No-sql database, XML format, data format based on a Prolog language, etc. The knowledge base 265 may be in a format that enables mapping problems to the solutions in term of monitoring programs.

Fields 301A-301C of the table 300 may comprise values indicating monitoring programs. The indication in field 301A may comprise for example an address of the monitoring program such as a REST-API call of the monitoring program. The monitoring program may implement monitoring functions and/or monitoring workflows. For example, the monitoring program may be a monitoring application that may observe and record the activity of specific applications or systems of the computing system 103A. The monitoring program may monitor information such as available disk space or application errors and compares the information to defined thresholds. When thresholds are exceeded, the monitoring program can either notify an administrator or respond automatically based on predefined rules.

The monitoring programs may be used for real-time and/or historical monitoring depending on the technical problem. A real-time monitoring program may be used to analyze a certain kind of database performance problem most efficiently than a historical monitoring. The monitoring program may also indicate what kind of historical data supports analysis of what kind of technical issues and how to process historical performance data to provide meaningful insights for a user to solve a certain kind of database performance problem.

The monitoring program may for example enable a monitoring plan which may be one of the following: a monitoring REST-API call to launch a specific monitoring function for a specific DB2 for z/OS subsystem with specific parameters, e.g., time frame, a monitoring workflow configuration that can be used to instantiate a process instance in the process engine.

Fields 301B-301C may optionally further indicate the monitoring configuration that would be preferable for a given technical problem. The monitoring configuration may comprise a set of monitoring options for the monitoring program. These options are defined in the monitoring program. The monitoring configuration may for example comprise the software and/or hardware configuration of the system indicated by attributes "sys1" and "sys2".

For example, two records may have the same value of the field 301A but different values of the fields 301B-301C i.e., the same monitoring program can be used but with different configurations. In another example, multiple monitoring programs may be used with the same configuration. In that case, two records may have the same values of fields 301B-301C but different values of field 301A.

Fields 303A-303B may comprise values indicating a technical problem of a computing system. For example, field 303A may comprise values indicating the problem category. Field 303B may comprise values indicating the time frame of the occurrence of the problem. Fields 305A-305B may comprise values indicating the configuration of a computing system. For example, field 305A may comprise values indicating the type of the computing system (e.g., name of DB2 for z/OS subsystem). Field 305B may comprise values indicating further configuration details such as the name of LPAR DB2 for z/OS subsystem resides on a DB2 for z/OS system.

Thus, each record 307A-307N includes values indicating a given technical problem, the system that it can be affected by (or concerned by) that technical problem and an indication of the monitoring program that can be used to identify the given technical problem in a system having similar configuration as the computing system described by fields 305A-305B.

The responsibility of the inference engine 113 is to parse the user input or inquiry, derive the performance issue category and map this to a ranked result set of monitoring programs.

The fields 303A-303B and 305A-305B may define a data structure or a format that describes or defines the technical problem.

FIG. 3 shows for exemplification purpose a single table representing the knowledge base 265; however, multiple tables may be used to represent the fields 301-305. For example, fields 301A-301C may be comprised in a respective table, fields 303A-303B may be comprised in a respective table and fields 305A-305B may be comprised in a respective table. The three tables may be linked to each so as to provide association between the values that belong to the same row or record 307A-307N.

In another example, the knowledge base 265 may be implemented using a relational database. The knowledge base can thus be managed by a relational database management system (RDBMS): wherein the inference engine 113 may further comprise the RDBMS.

While FIG. 3 only shows two fields for describing the technical problem and the computing system, it will be appreciated that more or less fields may exist or may be used.

Figure 4:
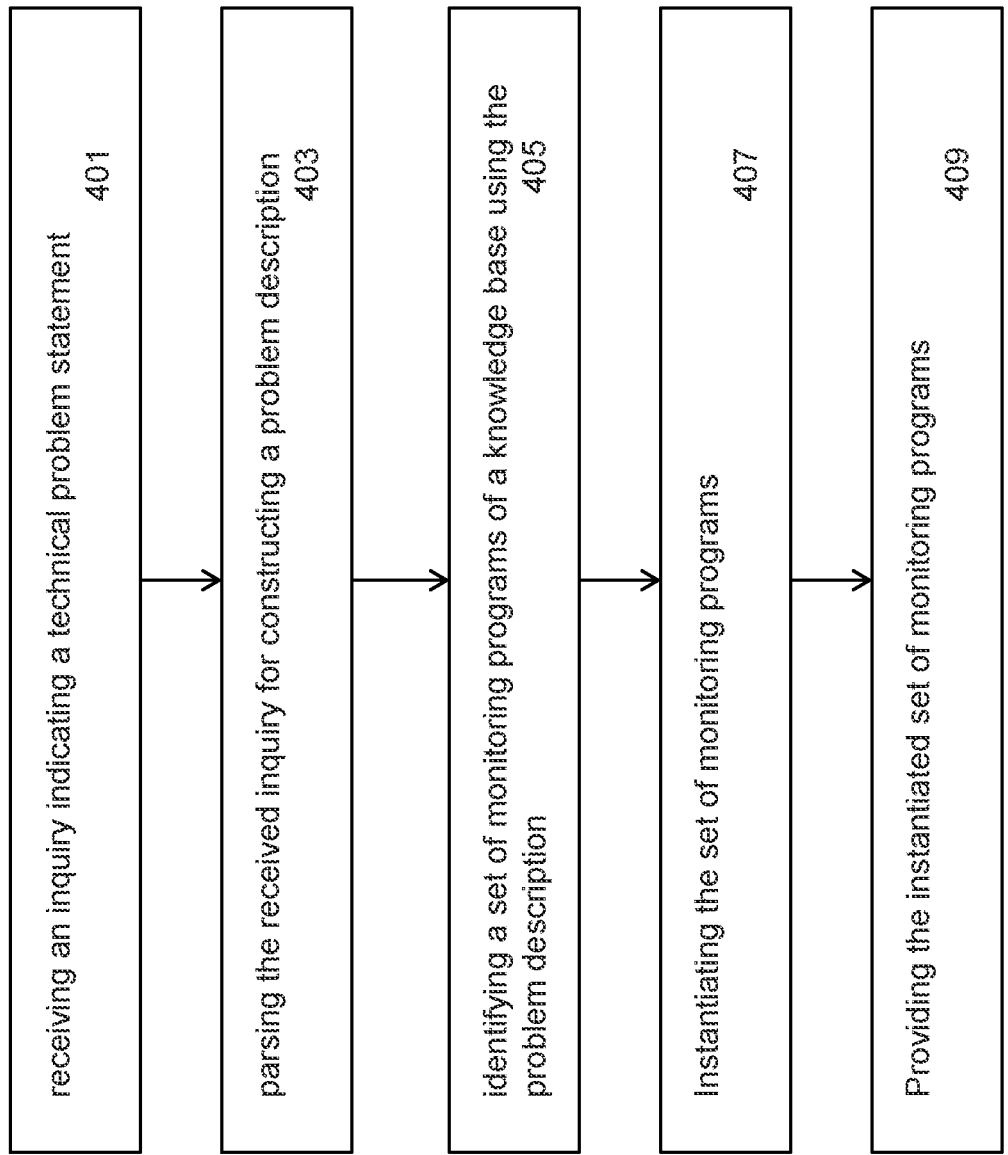
FIG. 4 is a flowchart of a method for providing support for identification of problem root cause in a computing system in accordance with an embodiment of the present invention.

FIG. 4 is a flowchart of a method for providing support for identification of problem root cause in a computing system (e.g., 103A).

In step 401, an inquiry relating to the computing system may be received from a requester or user of the computing system 103A. The inquiry indicates a technical problem statement of the computing system 103A.

For example, the user may launch the search application 107. The search application 107 may comprise instructions that when executed may display a graphical user interface. The graphical user interface may comprise a field for entering the inquiry by the requester.

In another example, the search application 107 may automatically start (e.g., at the time the computing system 103A is turned on).

The search application 107 may be a front end application that allows a user to describe its performance database issue using keywords and/or (partial) sentences. For example, the inquiry may comprise: "threads slow down on database SZ92 on par BOEPMO4" or "threads slow SZ92 BOEPMO4". This problem statement refers to a problem in the computing system being IBM DB2 for z/OS and may be used for exemplification purpose throughout the description of FIG. 4.

The search application 107 may comprise a client-server application in which the user interface runs on the monitor system 111 as a web server. For example, the search application 107 may for example comprise a web application, wherein the graphical user interface may be a web browser. The web application 107 may be accessed over the internet or intranet, through the web browser. The web application 107 may leverage the inference engine 113 to parse the user inquiry and to generate the inquiry response, i.e., a ranked list of monitoring programs.

In step 403, the parser 261 may parse the received inquiry for constructing a problem description in accordance with the data structure (e.g., fields 303A-303B and 305A-305B of table 300) that is used to define the technical problems that are stored in the knowledge base 265. The parser 261 may convert the inquiry into a parsed inquiry that conforms the data structure or that conforms a predefined format that is used to describe the technical problems in the knowledge base 265.

In order to parse and derive a problem description, the parser 261 may use predefined metadata. For example, a predefined list of technical problem definitions may be provided. In other terms, possible values of attributes "prob1", "prob2", "sys1" and "sys2" may be provided. The metadata that is used by the parser 261 may comprise meta information about technical problems as described above in association with corresponding values of the attributes "prob1", "prob2", "sys1" and "sys2". And may comprise meta information about hardware and/or software configurations in association with corresponding values of the attributes "sys1" and "sys2". The parser 261 may determine the semantics of each word or sequence of words in the inquiry and may use that semantics to compare them with the meta information.

Using the example of computing systems 103A-103N being DB2 for z/OS subsystems, the meta information may comprise the following: Meta information about monitored IT environment, e.g., names of monitored DB2 for z/OS subsystems, LPAR names, storage location of SMF data for each monitored DB2 for z/OS subsystem, performance database schema name for each monitored DB2 for z/OS subsystem, Meta information about DB2 for z/OS concepts and DB2 for z/OS architecture, e.g., threads, locks, timeouts, deadlocks, instrumentation categories like STATISTICS and ACCOUNTING, EDM pool, dynamic statement cache (DSC), static statement cache (SSC), Meta information about database performance problems like thread memory issues, locking issues etc.

Using the inquiry "threads slow SZ92 BOEPMO4" as example, the parser 261 may determine that "threads" is a database technology entity, "slow" is an attribute of the database technology entity "threads" with a negative connotation, "SZ92" is the name of a DB2 for z/OS subsystem and "BOEPMO4" is the name of an LPAR. As no timeframe has been specified so the system may derive a time frame itself, e.g., a near-term history interval like 10 minutes.

As a result of the parsing step 403, the parsed inquiry may comprise values of the attributes "prob1" and "prob2" and a description of the computing system 103A in accordance with attributes "sys1" and "sys2".

In step 405, a set of monitoring programs of the knowledge base 265 may be identified using the problem description as obtained in step 403. For example, the result generator 262 may perform a search in the knowledge base 265 using the parsed inquiry or the problem description. This may result in a ranked list of the set of monitoring programs that may additionally be annotated with explanations describing the set of monitoring programs.

For example, having values of attributes "prob1", "prob2", "sys1" and "sys2" as obtained in step 403, a search may be performed in the knowledge base 245 so as to compare the values of at least part of "prob1", "prob2", "sys1" and "sys2" with corresponding values in the knowledge base 265. In one example, if a record has at least part of the values of "prob1", "prob2", "sys1" and "sys2" obtained in step 403, that record may be selected and the monitoring program that is part of that record may be added to the list of monitoring programs.

The search in the knowledge base 265 may be an exact search or an approximate search. The approximate search may allow for patterns, e.g., regular expressions. The approximate search may for example comprise a fuzzy search which is a search that returns items that may not be a direct match.

In step 407, the set of monitoring programs may be instantiated in the monitor system (e.g., in the database monitor 115). The instantiation may be performed using the configurations associated with the set of monitoring programs (indicated in fields 301B-301C). The instantiation may further use software and/or hardware configuration data of the computing system 103A (being monitored or having the technical problem that the user wants to identify), if that software and/or hardware configuration is required and it is not indicated in fields 301B-301C. This may be advantageous in case the values of attributes "config1" and config2" do not match the software and/or hardware configuration data of the computing system 103A.

In order to instantiate a given monitoring program of the set of monitoring programs, a monitoring configuration of the given monitoring program may be determined. For that, the values of the fields 301B-301C that are associated with the given monitoring program may be used as monitoring configuration. In addition or alternatively, if the software and/or hardware configuration of the computing system 103A do not match at least in part values of attributes "config1" and "config2", the software and/or hardware configuration of the computing system 103A may be used to determine at least part of the monitoring configuration that may be a defined set of input variables that are applied to the set of monitoring programs to obtain a set of instantiated monitoring programs. In another example, the instantiation of the set of monitoring programs may be performed by shifting the values of the attributes "config1" and "config2" (e.g., by 5% so as to provide a test on a range of possible values of "config1" and "config2").

The software and/or hardware configuration of the computing system 103A may be determined or received from the requester in addition to or as part of the inquiry.

For example, the instantiation may be performed by the result instantiator 263 by taking the ranked list of monitoring programs and instantiates for each associated monitoring configuration the monitoring program in the process engine 267. The instantiation may not trigger any process execution.

In one example, each instantiated monitoring program of the set of instantiated monitoring programs may have a residency time that determines the lifetime of this instantiated monitoring program. If the instantiated monitoring program is not started within a respective residency time the instantiated monitoring program is deleted from the list of instantiated monitoring programs.

Furthermore, for each instantiated monitoring program a REST-API call may be created to start the associated process that executes instantiated monitoring program. For example, the output of the result instantiator is a ranked list of REST-API calls annotated with explanations. Each REST-API call may represent one of the following: a monitoring REST-API call to launch a specific monitoring function for the to-be-monitored computing system 103A, a monitoring workflow REST-API call to start a specific monitoring workflow process providing or executing the instantiated programs to the requester as support for identification of the problem root cause.

For example, an instantiated monitoring program of the list of instantiated monitoring programs may for example comprise instructions for querying and analyzing data stored in the data repository 117. However, since the processing of data the data repository 117 may require a lot of processing resources, the execution of the instantiated monitoring program may be offloaded to the analytical database system 119. For that, the process engine 267 may perform the following: periodically load data from the data repository 117 in a performance repository like OMPE's performance database and periodically offload performance database tables of the OMPE's performance database to an accelerator (for example, IBM DB2 Analytics Accelerator (IDAA)).

For example, the performance query executed against the data repository 117 might run much longer than the query served by IDAA. So the first query scenario may represent a kind of asynchronous task where the IDAA scenario is still a synchronous task.

Using the above example a monitoring program of the set of monitoring programs may comprise instructions for performing the following steps: Drive me to a e3270 session where I will be shown the completed threads in 10 min intervals; Show me the Exception Log file contents for SZ92 for the last two hours; Show me the Extended Insight Dashboard for SZ92 for the last hour; Show me the SQL Dashboard with the top 20 SQL of the last 2 hours ranked by Elapsed Time; Instantiate a workflow process which will allow for SQL Activity trace data collection; Schedule a Performance Query that operates (depending on the SLA) on data stored in the performance database or in IDAA to get the heavy hitters over the last two hours. In this example, the instantiation of that monitoring program is performed using monitoring configuration having values such as "SZ92", "SQL", "2 hours", etc.

In step 409, the list of instantiated monitoring programs and/or REST-API calls may be provided to the requester as support for identification of the problem root cause.

Figure 5:
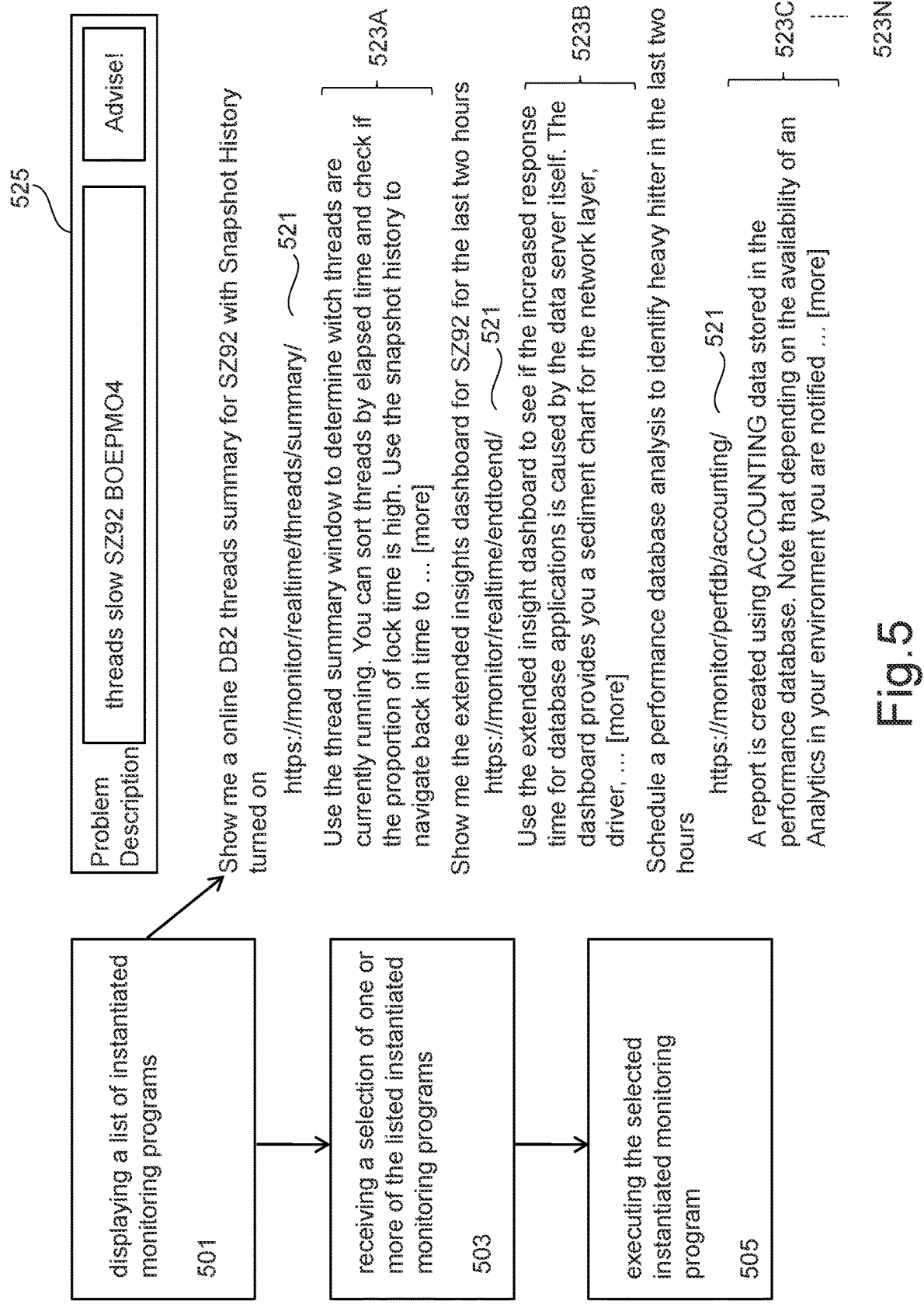
FIG. 5 is a flowchart of a method for identifying of a problem root cause in a computing system in accordance with an embodiment of the present invention.

FIG. 5 is a flowchart of a method for identifying of a problem root cause in a computing system (e.g. 103A).

In step 501, a list of instantiated monitoring programs (e.g., the one obtained in step 409) and/or API calls may be displayed. The list may be displayed on a graphical user interface of the user monitoring engine 109. The user interface of the user monitoring engine 109 may be the same as the user interface of the search application 107 (e.g., FIG. 5 shows field 525 for entering the inquiry). The displaying of the list may use user interface elements pointing to the instantiated programs in the monitor system 111. The user interface element may comprise one of a button or a hyperlink pointing to instantiated program. As shown in FIG. 5, the hyperlinks may comprise URLs 521.

The individual result set entries may be tagged with explanatory information 523A-523N to allow a DBA to develop confidence for individual inference results (e.g., explanatory information why and how a certain real-time or historical monitoring function has to be applied to analyze a certain kind of database performance problem).

In step 503, a selection of one or more of the listed instantiated monitoring programs may be received from the computing system 103A at the database monitor 115.

In step 505, the process engine 267 may execute the selected instantiated monitoring program. The execution may depend on the type of monitoring that is needed. For example, if the selected monitoring program requires processing of historical performance data to generate artefacts that can be used by a DBA to solve a database performance issue, the process engine 267 may load of performance data into a performance database, generate performance reports and generate of performance data in CSV format that is later on loaded into a spreadsheet and provided to a DBA for analysis.

In case the selected monitoring program requires a real-time monitoring in order to help the requester or the user to identify the root cause or the source of the problem in the computing system 103A, execution of the selected monitoring program may provide a dynamic visualization of the monitoring steps (e.g., on a screen window of the computing system 103A), where the user may switch between the steps using a "next" button and may terminate the monitoring using a "Quit" button. The user may also be enabled to switch to a continuous mode of execution instead of the step by step execution mode.

Figure 6:
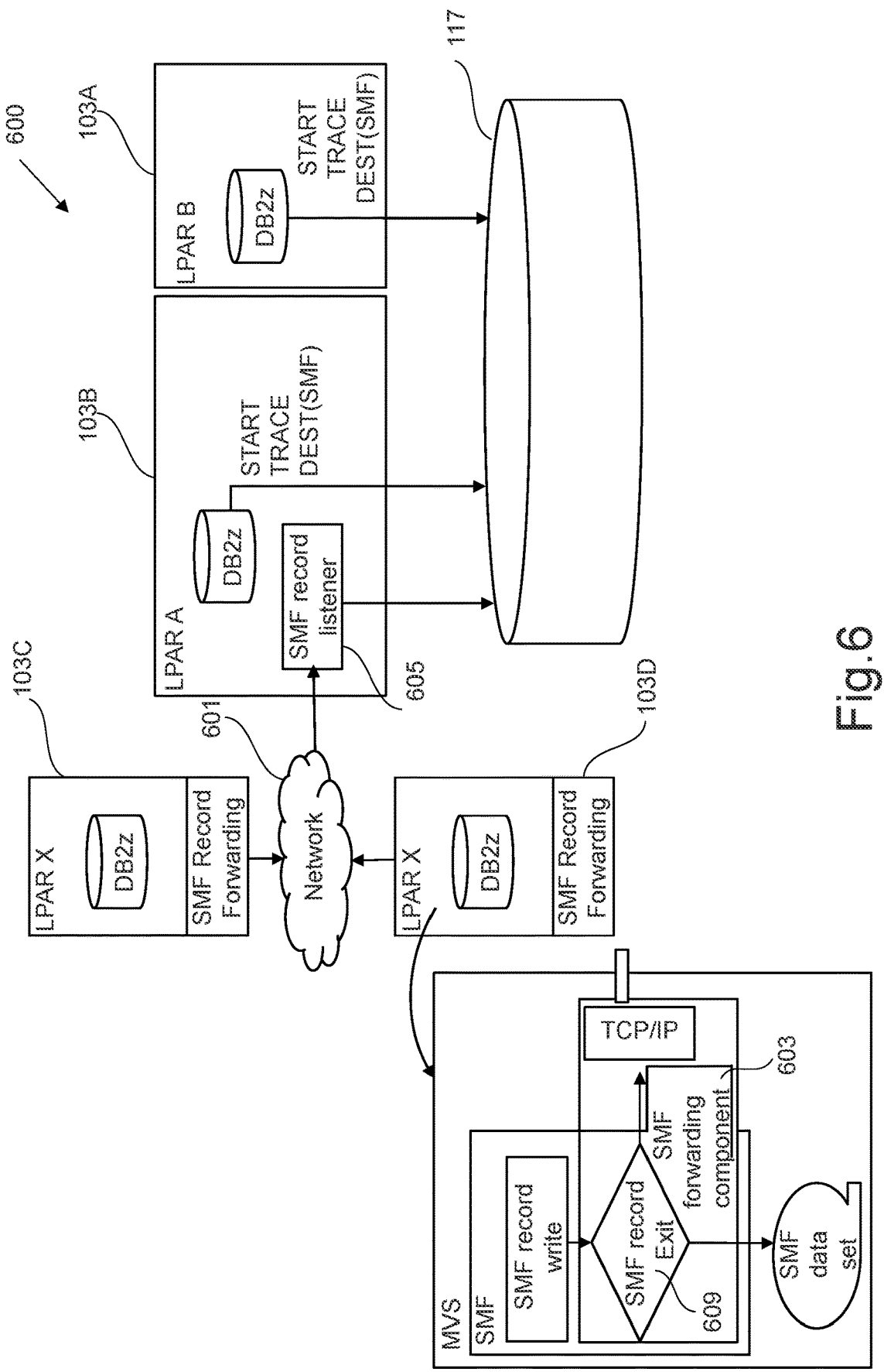
FIG. 6 depicts a block diagram of a data system for populating a data repository in accordance with an embodiment of the present invention.

FIG. 6 depicts a block diagram of a data system 600 for storing data in a data repository (e.g., 117).

The data system 600 comprises multiple computing systems (e.g., 103A-103D) as described above that are connected to the data repository 117.

In this example, DB2 SMF data maybe used as an example of data that can be stored in the data repository and that can be further used as described herein. Note that DB2 SMF records are used for the sake of simplicity but the same may apply to RMF, IMS, or CICS SMF records.

With respect to store the SMF data in the data repository 117 several scenarios may have to be distinguished:

1. A shared disk device may be accessed from the LPAR the monitored DB2 for z/OS subsystem is running on. For example, the computing systems 103A-B may access the shared disk being the data repository 117. In this scenario the SMF data is stored on the shared disk device accessible by the OS that implements the SMF service (e.g., z/OS or MVS).

2. The shared disk device may not be accessed from the LPAR the monitored D2 for z/OS subsystem is running on. For example, the computing systems 103C-103D may not directly access the shared disk being the data repository 117 and have to be connected via network 601 and one of the computing systems 103A-103B that comprises the database monitoring infrastructure (e.g., computing systems 103C-103D do not comprise a record listener as described below and which may be integrated as part of the monitoring functions in their respective search application 107 and have forwarding functionality). An example for this is a DB2 for z/OS subsystem that is running on an LPAR at a different location, e.g. another IT center that has to be connected via the network 601. In this setup, a SMF record forwarding mechanism is needed that pushes the SMF record in a bulk fashion from the source LPAR 103C-103D to the data repository 117. At the source LPAR 103C-103D a SMF record forwarding component 603 is needed that "talks" to a SMF record listener component 605 running on the LPAR where the database monitoring infrastructure is installed. Both components may communicate via an encrypted TCP/IP socket connection. The SMF record forwarding component 603 can be implemented using SMF record exits 609. Each time a SMF record is intended to be written by MVS (or z/OS) the SMF record exit handler 609 determines if the SMF record has to be written to a SMF data set, to a TCP/IP socket or both. On the other hand the SMF record listener component 605 receives SMF records from a TCP/IP socket and materializes them in a SMF data set in the data repository 117.

Using this SMF forwarding mechanism it is possible to provide an enhanced database monitoring infrastructure (e.g., as part of the user monitoring engine 109) as a kind of appliance in a cloud. For example, enhanced database monitoring infrastructure may provide means such that a user may configure what kind of SMF data is loaded into the performance database on a DB2 for z/OS level. Moreover, a user may be enabled to configure that data is aggregated while being loaded, e.g., on a 5 minute interval, etc. The SMF data stored in the data repository 117 can be used in two different ways. Either it can be seen as cold (passive) SMF data that is only processed on demand, i.e., when a monitoring program exists that has to use it to derive some insights for a user. Or it can be seen as hot data that is continuously processed, e.g. loaded into the performance repository or database. The loading of SMF data into a performance repository is already supported in a database monitoring system such as OMPE. To ensure maximum flexibility the behavior can be configured on a monitored DB2 for z/OS level in the enhanced database monitoring infrastructure.

With respect to data volume and data velocity the performance data stored in this data repository 117 can be characterized as BigData. The content of the data repository 117 may be obtained by continuously collecting data. For example, collected data may comprise low overhead DB2 for z/OS performance metrics, e.g., STATISTICS or ACCOUNTING. These low overhead performance metrics may be collected using DB2 for z/OS traces and stored in SMF or GTF data sets.

In another example, a performance monitoring system may be provided for monitoring a monitored computing system. The performance monitoring system comprises: an interface for receiving a plaintext inquiry relating to the monitored system from an application and returning inquiry results to the application; a knowledge base for storing domain information associated with the monitored computing system; a performance monitor for monitoring the monitored computing system; a query processor (Inference Engine) for parsing the plaintext inquiry received via the first interface based on domain information available in the knowledge base, constructing a problem description for the parsed query, creating a set of monitoring plans associated with the problem description, each monitoring plan involving a specific monitoring function of the performance monitor or a monitoring workflow configuration for the performance monitor, instantiating respective processes (e.g. monitoring workflow processes) in a process engine of the performance monitor for monitoring workflow configurations of the set of monitoring plans, returning means to trigger (links to) the set of monitoring plans via the interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for providing support for identification of problem root cause in a computing system, the method comprising:
   providing a knowledge base for mapping monitoring programs with respective to one or more technical problem definitions and a predefined system configuration, the technical problems being defined using a predefined data structure;
   receiving from a requester an inquiry relating to the computing system, the inquiry indicating a technical problem statement of the computing system;
   parsing the received inquiry for constructing a problem description in accordance with the predefined data structure that is used to define the technical problems that are stored in the knowledge base; and
   identifying a set of monitoring programs of the knowledge base using the constructed problem description.

2. The method as recited in claim 1, a monitoring program of the set of monitoring programs comprising real-time data monitoring instructions that when executed perform a real-time evaluation of current performances of the computing system.

3. The method as recited in claim 1, a monitoring program of the set of monitoring programs comprising instructions that when executed perform an offline evaluation of performances of the computing system using historical data collected for at least the computing system.

4. The method as recited in claim 1, the set of monitoring programs comprising multi-step processing instructions that when executed perform a guided step-by-step execution.

5. The method as recited in claim 4, wherein a switch between the steps is controlled by the requester.

6. The method as recited in claim 1, further comprising:
instantiating the set of monitoring programs in a monitor system; and
providing the instantiated programs to the requester as support for identification of the problem root cause.

7. The method as recited in claim 6 further comprising:
receiving a selection of one or more instantiated monitoring programs, and responsive to the received selection, executing the selected monitoring programs on the computing system.

8. The method as recited in claim 6 further comprising:
providing an interface, wherein the inquiry is received via the interface, the providing of the instantiated programs comprising: displaying on the interface user interface elements pointing to the instantiated programs in the monitor system.

9. The method as recited in claim 8, wherein the user interface elements comprise hyperlinks.

10. The method as recited in claim 6 further comprising:
assigning to each of the instantiated programs a residency time; and
in response to determining that time elapsed from providing an instantiated program of the instantiated programs exceeds the respective residency time, deleting the instantiated program.

* * * * *